United States Patent [19]

Kawamura

[11] 4,268,871
[45] May 19, 1981

[54] SCANNING OPTICAL SYSTEM FOR FORMATION OF A HALF TONE IMAGE

[75] Inventor: Naoto Kawamura, Inagi, Japan

[73] Assignee: Canon Kabushiki Kaisha, Tokyo, Japan

[21] Appl. No.: 43,268

[22] Filed: May 29, 1979

Related U.S. Application Data

[63] Continuation of Ser. No. 781,045, Mar. 24, 1977, abandoned.

[30] Foreign Application Priority Data

Mar. 30, 1976 [JP] Japan .................................. 51-34797
Apr. 14, 1976 [JP] Japan .................................. 51-42244
Oct. 20, 1976 [JP] Japan .................................. 51-125613

[51] Int. Cl.³ .............................................. H04N 1/22
[52] U.S. Cl. ..................................... 358/298; 358/235
[58] Field of Search ..................... 356/56, 61, 62, 199,
356/206, 230, 231, 232, 233, 235, 296, 298, 302;
350/353, 355, 358, 359

[56] References Cited

U.S. PATENT DOCUMENTS

| | | | |
|---|---|---|---|
| 2,158,990 | 5/1939 | Von Okolicsanyi | 358/235 |
| 2,797,619 | 7/1957 | Rosenthal | 358/235 |
| 2,818,465 | 12/1957 | Brink | 358/298 |
| 3,329,474 | 7/1967 | Harris et al. | 358/199 |

Primary Examiner—Joseph A. Orsino, Jr.
Attorney, Agent, or Firm—Fitzpatrick, Cella, Harper & Scinto

[57] ABSTRACT

A scanning optical system having an optical system capable of controlling formation of a half tone image which is constructed with a light source, a first aperture which restricts a light beam of the light source, an image focusing optical system provided at the opposite side of the light source relative to the first aperture, a second aperture provided at an optically conjugative position with the first aperture with respect to the image forming optical system, a deflector composed of a crystal interposed between the first aperture and the second aperture, a collimator lens which collimates the light beam from the second aperture, and a scanning device which scans the light beam from the collimator lens in a certain definite direction.

33 Claims, 37 Drawing Figures

FIG. 18
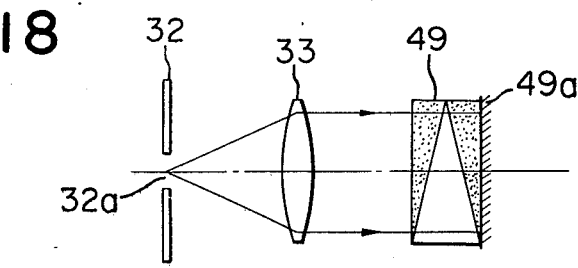
FIG. 19(A)   FIG. 19(B)   FIG. 19(C)
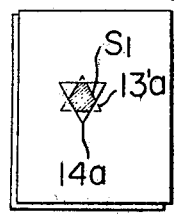 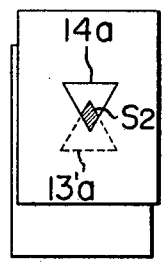 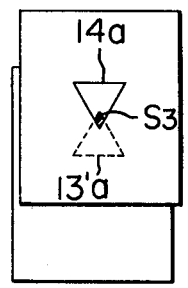
FIG. 20
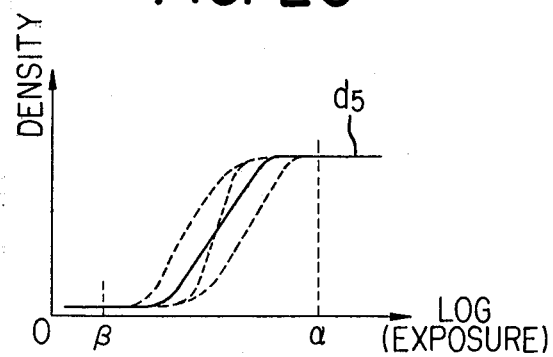

FIG. 21(A)     FIG. 21(B)     FIG. 21(C)
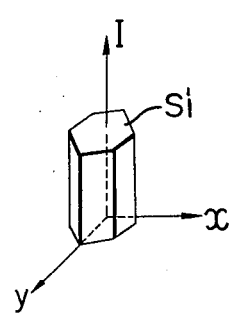 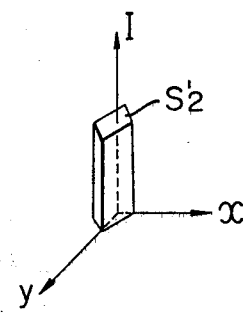 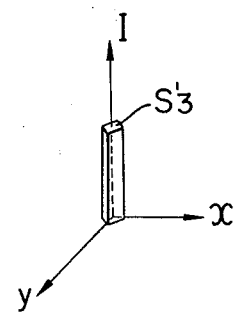
FIG. 22
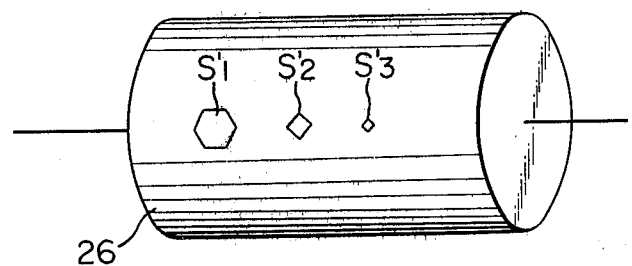
FIG. 23
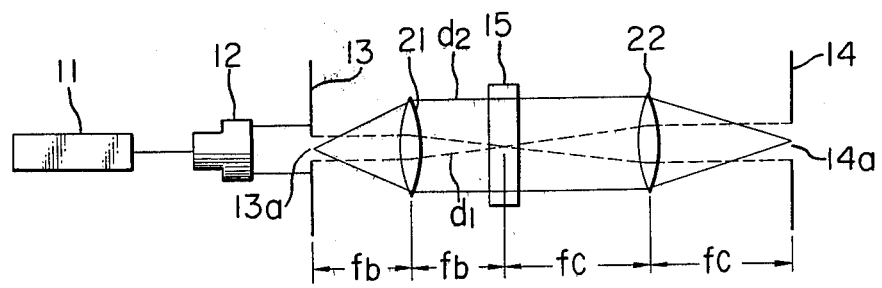

SCANNING OPTICAL SYSTEM FOR FORMATION OF A HALF TONE IMAGE

This is a continuation of application Ser. No. 781,045, filed Mar. 24, 1977, now abandoned.

BACKGROUND OF THE INVENTION

This invention relates to an image scanning device. More particularly, it is concerned with a scanning optical system in such image scanning device having a half tone image forming optical system which records such half tone images, or records and displays such half tone images on an appropriate display medium.

A scanning optical system utilizing a rotatory polygonal mirror and a vibrating mirror has generally been used in various types of recording and displaying devices such as facsimile devices utilizing laser beam, various types of display devices, printing devices, and so forth, due to its capability of taking a large scanning angle, and due to its minimal color dispersion. In particular, when the rotatory polygonal mirror is used in the scanning optical system, it can be widely used as a high speed scanning device.

As a method for recording or displaying a half tone image in such a scanning optical system, there has been known one that utilizes the photosensitivity characteristic of the recording or displaying surface by imparting an intensity modulation to a scanning beam by a conventional light modulator. However, this method of forming the half tone image in utilization of the photosensitive characteristic of the photosensitive part makes it necessary that a method for modulating the intensity of the scanning beam be continuously varied in accordance with the characteristic of the photosensitive part. The characteristic of the photosensitive part is liable to be affected by changes in the surrounding circumstances such as, for example, atmospheric temperature, humidity, and so on, and, particuarly, when the electrophotographic method is employed on this photosensitive part, a remarkable influence due to the static electricity is inevitably. In addition, this method is incapable of avoiding the influence of the drift phenomenon, in which an output from a light source such as laser, etc. fluctuates with lapse of time with the consequence that a stable half tone image is very difficult to maintain over a long period of time.

SUMMARY OF THE INVENTION

In view of the above-described disadvantage in the known scanning optical systems, it is an object of the present invention to provide an improved scanning optical system which undergoes less influence due to fluctuations in the photosensitive characteristic of a recording and displaying surface, and which is capable of obtaining a stable half tone image over a long period of time.

The present invention, unlike the abovementioned method of utilizing intensity variation in the scanning beam and the photosensitive characteristic of the photosensitive member, utilizes an optical system which causes the cross-sectional area of the scanning beam to vary. In other words, the scanning optical system according to the present invention has a half tone image forming optical system interposed between a scanning device and a light source in a scanning optical system comprising the light source such as laser, etc., the scanning device such as, for example, rotatory polygonal mirror or a vibrating mirror, to the scan light beam from the light source and an image forming lens system for the scanning beam which converges the scanning beam from the scanning device onto a scanning surface.

The optical system to form the abovementioned half tone image comprises a first aperture, an image forming optical system provided on the opposite side of the light source relative to this first aperture, a second aperture provided at a position optically conjugative with the first aperture relative to the image forming optical system, and a deflector consisting of a crystal and interposed between the first aperture and the second aperture.

For this half tone image forming optical system, there are two types: the first type is so constructed that the first aperture and the second aperture are disposed to hold the abovementioned deflector between them; and the second type is so constructed that the first aperture and the second aperture are provided within one and the same plane formed perpendicularly to the optical axis of the half tone image forming optical system, the system having therewithin a reflecting surface so as to form a deflection-reflection optical system with this reflecting surface and the deflector. The deflection-reflection optical system in this second type is produced by combining a crystalline light deflecting element and a flat reflecting mirror, or by applying a reflective coating on the surface of this crystalline light deflecting element. By holding this light deflecting element on its both sides with the reflecting surfaces, the number of times the scanning beam passes through the light deflecting element can be increased.

Therefore, the scanning beam from the light source, after its passage through the first aperture, undergoes directional change due to the light deflector consisting of a crystal, and the image position of the first aperture to be focused on the second aperture by the abovementioned image forming optical system is displaced. The light beam passed through the second aperture results in a desired half tone image at a portion, where the first aperture image and the second aperture overlap each other, owing to variation in the area of the overlapped portion.

There are two ways to change the area of this overlapped portion. The first expedient is to directly put information of the half tone image into the deflector to control the scanning beam. In this case, the deflector to be used may be made of either prisms utilizing an acousto-optical crystal or electro-optical crystal, or a combination of such electro-optical crystal and an optical element such as Wollaston prism, Rochon prism, etc. which divides natural light into two linear polarized light beams having mutually orthogonal polarization planes and maintains these two light beams in an orthogonally intersected state, i.e., in a non-parallel state to each other. The second expedient is to provide a light source which is capable of oscillating scanning beams having different wavelengths in correspondence to signals of the half tone image, in which case the deflector may be one that controls the cross-sectional area of the scanning beam solely by disposing a color dispersion prism.

Further, when the abovementioned first aperture is illuminated by a parallel beam, it becomes possible to differentiate a position where the first aperture is focused by the image forming optical system and a position of a diffracted beam from the first aperture on the spectral surface due to the image forming optical system, hence the deflector is disposed on this spectral position.

The foregoing object and other objects of the present invention as well as specific construction and functions of the scanning optical system thereof will become more apparent and understandable from the following detailed description of the invention, when read in conjunction with the accompanying drawing illustrating specific preferred embodiments of the present invention.

BRIEF DESCRIPTION OF DRAWING

In the drawing:

FIGS. 17 and 18 respectively shows the half tone image forming optical system according to the present invention;

FIGS. 19A, 19B, 19C, 20, 21A, 21B, 21C, and 22 are respectively diagrams for explanation of the process of forming the half tone image;

FIG. 23 is a diagram for explaining the relationship between an incident aperture and a spatial spectrum of the aperture;

DESCRIPTION OF PREFERRED EMBODIMENTS

Figure 1A:
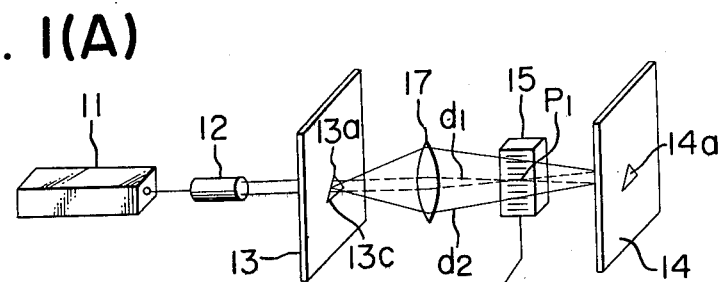
FIG. 1A is a general, schematic perspective view showing one embodiment of the half tone image forming optical system according to the present invention.
Figure 1B:
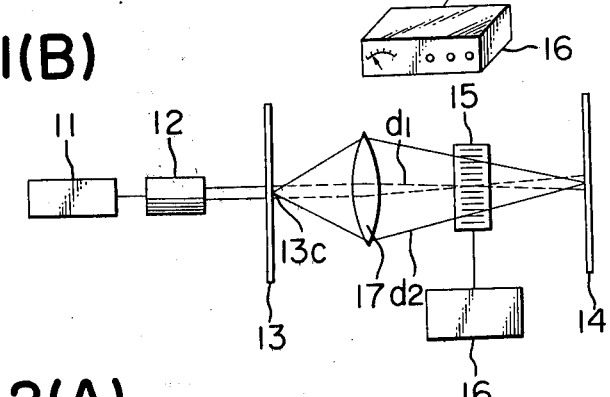
FIG. 1B is a side elevational view of the system shown in FIG. 1A.

Referring to FIGS. 1A and 1B, the deflector used in this embodiment is an acousto-optical light modulating element (hereinafter referred to as "A0 element"). This embodiment illustrates a case, in which two apertures are made to be in an optically conjugative relationship by a single image forming lens.

Incidentally, it should be understood that those members used in the subsequent embodiments according to the present invention, and which are the same as those used in this embodiment are designated by the same reference numerals.

A light beam from a laser 11 used as the light source is expanded in beam diameter by a beam expander 12, and then illuminates an incidence aperture 13a formed in an incidence slit plate 13 in the form of a parallel light beam. This incidence aperture is provided at a position optically conjugative with a projection aperture 14a formed in a projection slit plate 14 through an image forming lens 17. An acoustooptical element (A0) 15 is disposed in the light path extending between the image forming lens 17 and the projection aperture 14a. A signal from a control circuit 16 causes a piezo-electric element (not shown) fixedly provided on the A0 element to vibrate to generate a supersonic wave. This supersonic wave propagates through the A0 element 15. When the light beam is projected into the A0 element in this state of supersonic wave propagation, there occurs the Bragg diffraction, and the incident beam is subjected to a directional change. Since this Bragg diffraction angle can be freely varied by the frequency modulation of the supersonic wave propagating through the A0 element, it can be arbitrarily changed by a signal from the control circuit 16. Accordingly, by changing this Bragg diffraction angle, the cross-sectional area of the scanning beam passing through the projection aperture 14a can be varied. Dot lines $d_1$ shown in FIG. 1 denote the diffracted light of zero order passing through the incidence aperture 13a, which forms its spectral image on a focal plane $P_1$ of the image forming lens 17. On the other hand, solid lines $d_2$ denote light beams which propagate through the A0 element by way of the image forming lens 17 with a point 13c in the incidence aperture 13a as a secondary light source. A parallel light beam from the abovementioned beam expander 12 is diffracted by the incidence aperture 13a, and this diffracted light forms its spectral image on the focal plane $P_1$ of the image forming lens 17. When the A0 element as the deflector is provided in the vicinity of this position $P_1$, the size of the A0 element can be made small, and, moreover, any adverse effect within the element due to inhomogeneity can be alleviated. The reason for this is that, since the light beam to illuminate the incidence aperture 13a is not converged on this aperture, the spectral surface $P_1$ of this incidence aperture 13a due to the image forming lens 17 can be spatially separated from the image surface 14a of this aperture 13a.

Figure 2A:
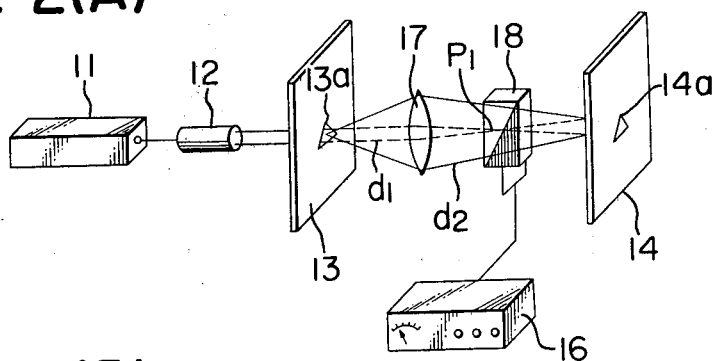
FIGS. 2A and 2B are respectively perspective views showing different embodiments of the half tone image forming optical system according to the present invention.

Referring now to FIG. 2A, the deflector used in this embodiment is an electro-optical light modulating element (hereinafter referred to as "E0 element") in place of the A0 element. The deflector used in the FIG. 2B embodiment is a combination of the E0 element and an optical element such as Wollaston prism, Rochon prism, etc. which splits incident natural light into two light beams having mutually orthogonal polarization planes, and which is capable of taking out these two light beams in the state of their not being parallel to each other, i.e., in the state of their having mutually a declination (hereinafter referred to, throughout the present specification, as "polarization optical element").

The deflector 18 shown in FIG. 2A is based on a principle such that, when an electric field is applied to a crystal, etc., the refractive index of the crystal varies. Thus, in this deflector, an angle of the light beam projecting from this E0 element is caused to vary by varying the electric field to be applied to the prism 18 made of this E0 element. Similar result can be obtained even when this polarization optical element is interchanged with the A0 element shown in FIG. 1.

Figure 2B:
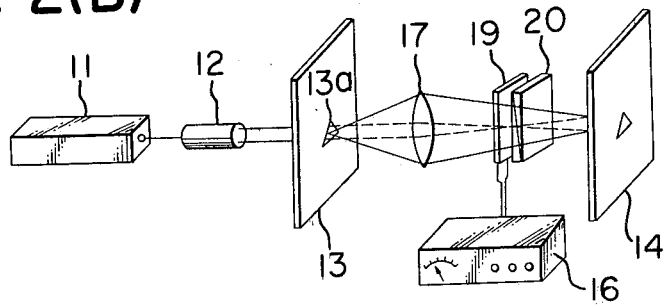

The deflector shown in FIG. 2B is a combination of the E0 element 19 and the abovementioned polarization optical element 20, in which the direction of the light beam projection can be divided into two different directions whether or not the electric field is applied to the E0 element 19. In this case, the light beam from the laser 11 should preferably be polarized. If it is not polarized, a polarization filter must be inserted. In other words, the deflected beam projecting from the laser 11 enters into the polarization optical element 20 such as the combination of the E0 element and the Wollaston prism through the beam expander 12, incidence aperture 13a, and the image forming lens 17. In this case, the deflecting direction of the deflected beam from the laser is so predetermined that the beam from the polarization optical element 20 may project upward, when no electric field is applied to the E0 element 19. Since the deflecting direction of the beam emitted from the E0 element 19 is turned by 90 degrees, when the electric field is applied to the E0 element, the beam projecting from the polarization optical element is bent downward. In this consequence, it is possible to choose two discontinuous projection angles by means of this set of E0 element and the polarization optical element, and, by arranging N sets of this combination, $2^N$ numbers of variations in the discontinuous projecting angles can be obtained. Similar effect can be achieved, even when this deflector (19, 20) is replaced by the A0 element 15 shown in FIG. 1A.

Figure 3A:
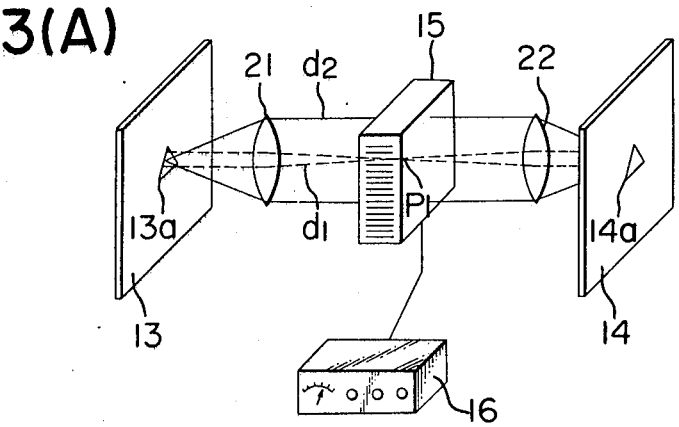
FIGS. 3A, 3B, and 3C are respectively perspective views showing other modifications of the half tone image forming optical system according to the present invention.
Figure 3B:
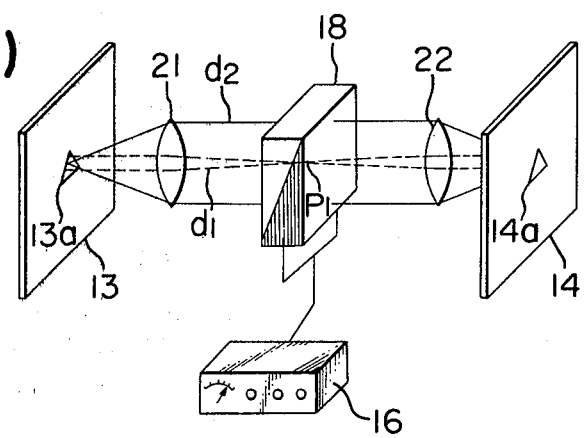
Figure 3C:
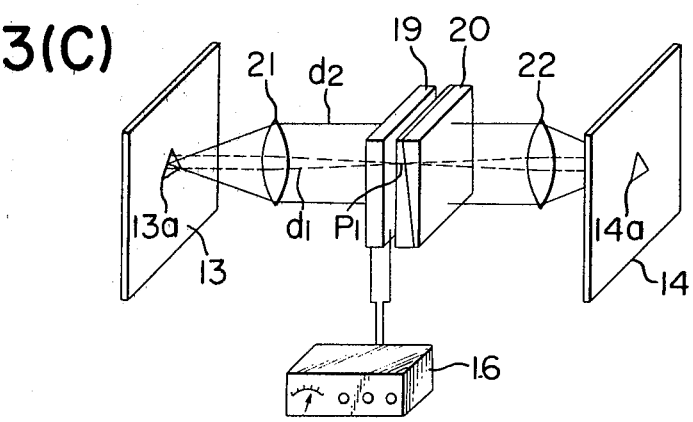

Referring to FIGS. 3A, 3B, and 3C which illustrate other embodiments of the half tone image forming optical system, the deflector in each embodiment is disposed at a position where the beam becomes afocal due to the image forming optical system (21, 22) interposed between both apertures (13, 14). FIG. 3A indicates a case where the A0 element 15 is used as the deflector, in which the beam $d_2$ which propagates through the deflector with a point 13c in the incidence aperture 13a as the second light source becomes parallel by the incidence lens 21 having one of its focal planes in the aperture 13a. After passage through the A0 element 15, the parallel beam is converged on the projection aperture 14a by means of the projection lens 22 having one of its focal planes in this projection aperture 14a. Incidentally, when the A0 element 15 is provided on the spectral image plane $P_1$ of the incidence aperture 13a due to the abovementioned incidence lens 21, it can be made small in size. FIG. 3B shows the half tone image forming optical system utilizing the prism 18 made of the E0 element as the deflector, and FIG. 3C shows the half tone image forming optical system, in which the E0 element 19 and the polarization optical element 20 are used as the deflector. In these three embodiments, each deflector (18, 19, 20) is disposed in the parallel beam path between the incidence lens 21 and the projection lens 22, and also in the vicinity of the abovementioned spectral image plane $P_1$.

Figure 4A:
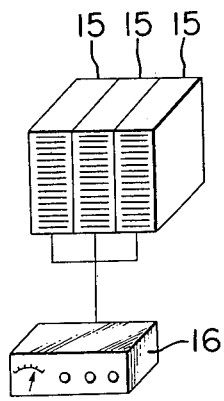
FIGS. 4A, 4B, and 4C are respectively perspective views showing various deflectors to be used for the purpose of the present invention.
Figure 4B:
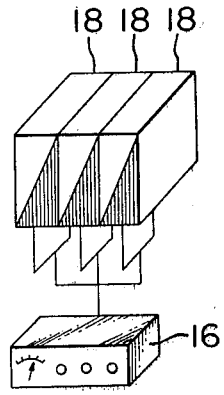
Figure 4C:
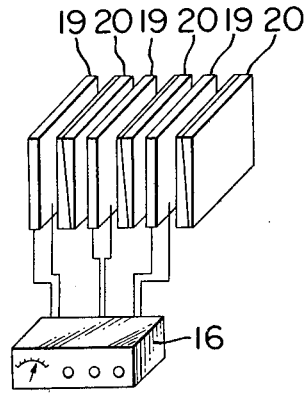

In the half tone image forming optical system shown in FIGS. 1A, 1B, 2A, 2B, 3A, 3B, and 3C, the deflector is used in a single body. It should, however, be understood that, by providing a plurality of such deflectors (15, 18, 19, and 20) in series as shown in FIGS. 4A, 4B, and 4C, larger deflecting angle can be obtained. Even in the case of arranging a plurality of the deflecting elements as such, the deflector as a whole can be made small in size by providing the same at a position of the spectral image plane $P_1$.

Figure 5:
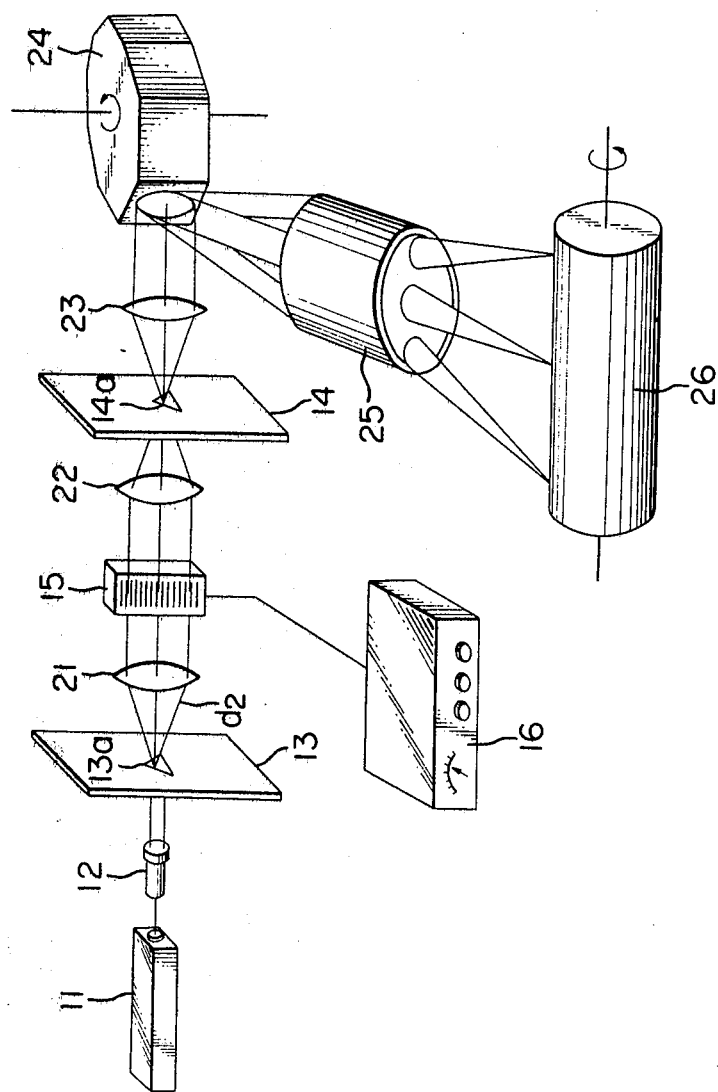
FIG. 5 is a perspective view showing one embodiment of the scanning optical system utilizing the half tone image forming optical system according to the present invention.

Referring to FIG. 5 which illustrates a scanning optical system utilizing one embodiment of the half tone image forming optical system according to the present invention, a light beam projected from the laser 11 is expanded by the beam expander 12 to illuminate the incidence aperture 13a. The light beam $d_2$ which utilizes the thus illuminated incidence aperture 13a as the secondary light source is rendered a parallel beam by the incidence lens 21. After the parallel beam is deflected by the A0 element 15 which is controlled by a signal from the control circuit 16, it forms an incidence aperture image on the projection aperture 14a by means of the projection lens 22. At this time, the scanning beam passes through only the portion where the incidence aperture image overlaps with the projection aperture. The scanning beam which makes this projection aperture 14a a new light source is rendered a parallel beam by a collimator lens 23 and is scanned by a rotatory polygonal mirror 24, after which it forms an image on a photosensitive drum 26 as the scanning surface by means of a scanning image forming lens 25. By the rotation of this rotatory polygonal mirror 24, the scanning beam rectilinearly scans the drum 26, and, at the same time, the drum 26 per se rotates to cause the two-dimensional scanning to be effected.

Figure 6:
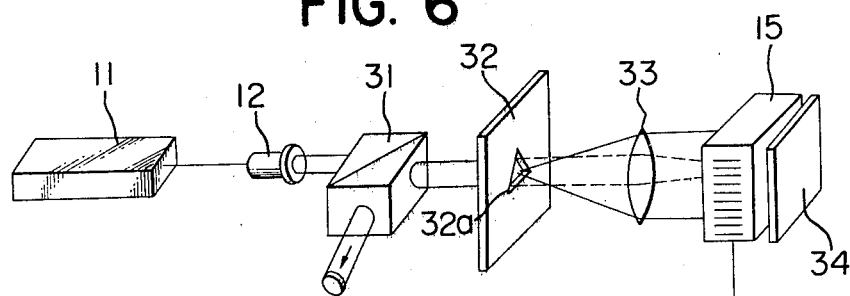
FIG. 6 is also a perspective view showing still other embodiment of the half tone image forming optical system according to the present invention.

FIG. 6 is a perspective view showing one embodiment of the half tone image forming optical system utilizing a reflection type polarization optical system in accordance with the present invention, in which the light source is simultaneously shown. FIG. 6 shows a case, wherein a crystalline A0 element is used as the deflecting element, and an image at the opening part of the light intercepting plate is formed once again on the same opening part by means of the image forming lens system. That is to say, the light beam from the laser 11 is rendered to have an appropriate beam diameter by means of the beam expander 12, and enters into a beam splitter 31 in its state of the parallel light beam. The light beam, after it has passed through the beam splitter, illuminates an aperture 32a perforated in a slit plate 32. The incident light beam which has passed through the aperture 32a is collimated by the image forming lens system 33 having one of its focal planes on the aperture, and then enters into the A0 element 15. The light beam which has been reflected under the Bragg condition in the A0 element is further reflected by a flat reflecting mirror 34 to be re-directed to the A0 element 15. After the beam is again Bragg-reflected by the A0 element, it returns to the aperture 32a of the slit plate 32 through the image forming lens system 33. In this case, if a setting is so made with respect to a certain reference signal from the control signal 16 that the light beam to be reflected by the optical system (15, 33, 34) may accurately goes back to the aperture, it becomes possible to vary the cross-sectional area of the light beam passing through the aperture 32a by varying a signal from the control circuit with the abovementioned reference signal, and by varying the Bragg angle in this AO element 15.

Figure 7:
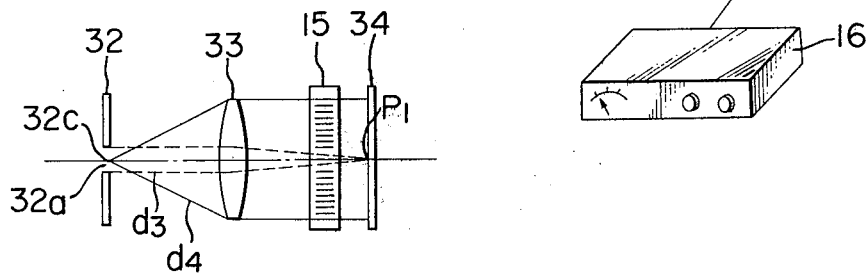
FIG. 7 is side elevational view of the optical system shown in FIG. 6.

FIG. 7 shows a side elevational view of the half tone image forming optical system (32, 33, 15, 34) shown in FIG. 6. As shown in FIG. 7, the dot lines $d_3$ denote diffracted light of zero order passing through the aperture 32a, the spectral image of which is formed on the focal plane $P_1$ of the image forming lens system 33. Solid lines $d_4$ denote the light beam which propagates through the deflector by way of the image forming lens system 33 with a point 32c in the aperture 32a as the secondary light source. Parallel light beam from the abovementioned beam splitter is diffracted at this aperture 32a, and the diffracted light forms its spectral image on the focal plane $P_1$ of the image forming lens system 33. When a reflecting mirror 34 is provided in the vicinity of this position $P_1$, and the AO element which functions as the deflector is disposed close to this reflecting mirror, the signal rising time can be quickened, and the AO element per se can be made small in size, and, further, any influence to be caused by nonhomogeneity within the element can be relaxed. This means that, since the coherent light beam which illuminates the aperture 32a is not converged on the aperture 32a, the spectral surface $P_1$ of the aperture 32a due to the image forming lens system 33 can be spatially separated from the image surface of the aperture 32a.

As shown in FIG. 7, when the deflecting element utilizes the Bragg reflection as in the AO element, and the AO element is disposed perpendicularly with respect to the optical axis O of the image forming lens system, and the aperture is on the optical axis of the image forming lens system, the light beam which passes through the aperture 32a of the light intercepting plate and collimated by the image forming lens system does not have an intersecting angle with the wave plane of the supersonic wave propagating within the AO element with the consequence that the light beam is not reflected. In order therefore that the light beam is subjected to the Bragg reflection at the AO element, it is necessary that the incident light beam into the AO element be made to have a certain angle of intersection with the wave plane of the supersonic wave which propagates through the AO element. An expedient to achieve such purpose is shown in FIGS. 8A and 8B.

Figure 8A:
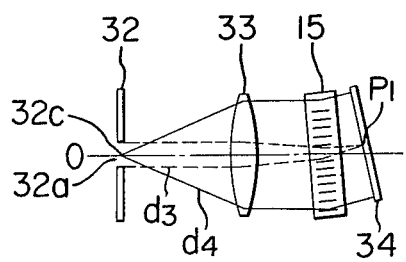
FIGS. 8A and 8B are side elevational views of the embodiments of the half tone image forming optical system according to the present invention.

Referring to FIG. 8A, there is shown a case, in which the AO element 15 is provided in an inclined position with respect to the optical axis of the image forming lens system 33, and the distance from the aperture 32 to the lens 33 and the distance from the lens 33 to the reflecting mirror 34 are made equal to the focal length of the image forming lens 33. In the half tone image forming optical system shown in FIG. 8A, when a reference signal from the control circuit is applied to the AO element, the light beam which is collimated by the image forming lens system 33 with every point in the aperture 32a as the secondary light source is subjected to the Bragg reflection at the AO element. In this case, the optical system is so set that the primary Bragg reflection light may be projected perpendicularly onto the reflecting mirror 34. Consequently, the primary Bragg reflection light to be projected onto the reflecting mirror returns to the aperture 32a through the same path as that of its incidence, so that the cross-sectional area of the light beam projected from the half tone image forming optical system is the same in size as that of the aperture.

Figure 8B:
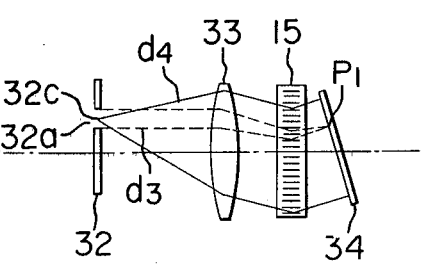

Referring to FIG. 8B, there is shown a case, in which the aperture 32a is not disposed on the optical axis, although the AO element 15 is provided perpendicularly with respect to the optical axis 0 of the image forming lens system same as in the abovementioned case. In this case, it is only sufficient that the reflecting mirror 34 be disposed in inclination to the optical axis 0. The light path diagram shown in FIG. 8B is one, in which a reference signal is applied to the AO element, as is the case with FIG. 8A, and in which the light beam to be dispersed with the aperture 32a as the second light source is collimated by the image forming lens system 33, and is projected into the AO element 15. In this case, the optical system is so set that the light beam which has been subjected to the primary Bragg reflection at the AO element 15 may be projected perpendicularly onto the reflecting mirror.

Figure 9:
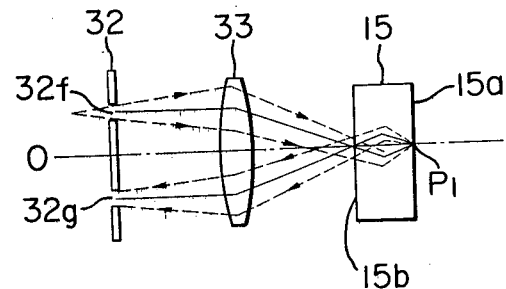
FIG. 9 is also a side elevational view of the embodiment of the half tone image forming optical system according to the present invention.

FIG. 9 indicates one embodiment of the half tone image forming optical system, in which two apertures are formed in the light intercepting plate 32, the one 32f is for light incidence and the other 32g is for light projection. In this embodiment, by applying a reflective coating on one surface 15a of the AO element 15 opposite to another surface 15b where the light beam is projected, the reflecting mirror 34 shown in the previous embodiment can be dispensed with. At this time, if the aperture is illuminated with scattered light beam to a slight extent, the spectral surface of the light beam can be formed on this reflecting surface 15a. The apertures 32f and 32g are equi-distantly positioned from the optical axis 0 of the image forming lens system 33, and the two surfaces (15a, 15b) of the AO element 15 are parallel to each other and are provided perpendicularly with respect to the optical axis. The dispersion light beam projected from the aperture 32f enters into the AO element 15 through the image forming lens system 33, and forms an image on the reflecting surface 15a by the primary Bragg reflection. The light beam from the reflecting surface 15a is again subjected to the Bragg reflection, after which it reaches the aperture 32g through the image forming lens. As shown in FIG. 9, when a signal to be applied to the AO element is a reference signal, the light path of the light beam passing through the optical system (33, 15) becomes symmetrical to the optical axis.

It is possible, as a matter of course, that the embodiment of FIG. 9, in which a reflective coating is applied to one side of the deflector to eliminate the reflecting mirror, be used in the deflectors of the arrangement as shown in FIGS. 8A and 8B. In this case, the incidence surface and the reflection surface of the light beam into and at the deflector are not made parallel each other, but there may be used such a deflector 15 that possesses a reflecting surface thereof commensurate with the inclination of the reflecting mirror 34. Such measures of eliminating the reflecting mirror by applying the reflective coating on the deflector is effective for relaxing the undesirable influence due to vibration.

Figure 10A:
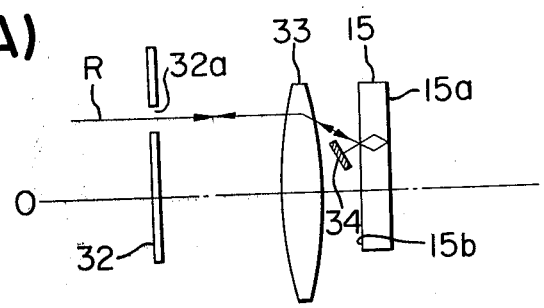
FIGS. 10A and 10B are also side elevational views of the embodiments of the half tone image forming optical system according to the present invention.
Figure 10B:
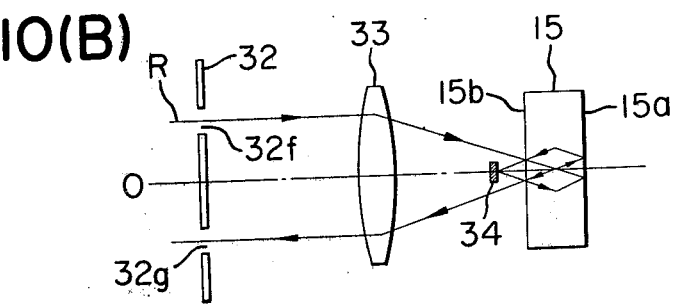

FIGS. 10A and 10B indicate other embodiments of the half tone image forming optical system, in which the light may pass through the deflector four times. FIG. 10A shows a case where a single aperture is used, and FIG. 10B shows a case where two aperture are used, i.e., one for light incidence and the other for light projection. In FIG. 10A, the light intercepting plate 32 and the AO element 15 are provided perpendiculary with respect to the optical axis 0 of the image forming lens system 33, and the surfaces (15a, 15b) of the AO element are mutually parallel, the reflective coating being applied on the surface 15a. A reference symbol R shows the main light ray of the light beam. The light beam, which has sequentially passed through the aperture 32a and the image forming lens system 33, is twice subjected to the Bragg reflection by the AO element, after which it is projected from the AO element to enter into the reflecting mirror 34. In this case, since the optical system is so set that the primary Bragg reflection light may be projected perpendicularly to the reflecting mirror 34, when a reference signal is applied to the AO element the light beam returns to the aperture 32a by reversely tracing its incidence light path. In this connection, it should be understood that the construction shown in FIG. 10A is also useful in the embodiment shown in FIG. 8A, in which the deflector is provided in inclination. By the way, it is desirable that the spectral surface of the light beam be disposed in such a manner that it may come on the reflecting mirror 34.

In the embodiment shown in FIG. 10B, the light intercepting plate 32 and the AO element 15 are disposed perpendicularly to the optical axis 0 of the image forming lens system 33, and the surface 15a of the AO element is applied with a reflective coating. The light beam R sequentially passes through the aperture 32f and the image forming lens system 33, and is subjected to the Bragg reflection for two times at the AO element 15, after which it is reflected by the mirror 34. The light beam is again subjected to the Bragg reflection for two times at the AO element, and then it reaches the aperture 32g through the image forming lens system 33. In this case, the optical system is so disposed that, of the light beams which pass through the aperture 32f, those which are subjected to the primary Bragg reflection at the AO element may pass through the aperture 32g, when a reference signal is applied to the AO element.

In general, the deflector utilizing a crystal is able to effectively remove its defects such that it is superior in its high speed characteristic, but is small in its degree of deflection, by causing the light beam to pass through the deflector for a plurality of times, as described in the above-mentioned embodiment.

In the abovementioned embodiments of the half tone image forming optical system, the light beam is caused to pass through the deflector two times and four times, respectively, but it is possible to cause the same to pass through the deflector a greater number of times than these previous embodiments. Also, in the above embodiments, explanations have been made in reference to the AO element utilizing the Bragg reflection as the deflector, but it is of course possible to use a different deflector element than the AO element with the same effect as the AO element in the abovementioned embodiments.

Figure 11:
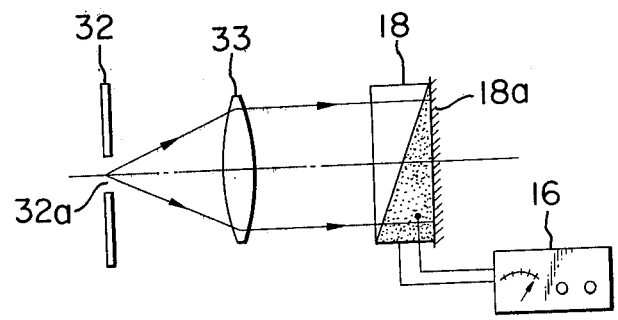
FIGS. 11 and 12 are also side elevational views of the embodiments of the half tone image forming optical system according to the present invention.

FIG. 11 illustrate use of a prism 18 made of an electro-optical (EO) light modulating element as the deflector. The prism 18 is applied on its one surface 18a with a reflective coating, thereby forming the reflection type deflecting system. As shown in FIG. 11, when no electric field is applied to the EO element, the deflector 18 does not work as the prism with the result that the light beam passing through the aperture 32a is vertically reflected at the reflecting surface 18a of the deflector 18 to go back along its incidence path and forms an image on the aperture 32a. By arranging a plurality of the prisms 18 of this construction, the deflecting angle of the deflector can be made large.

Figure 12:
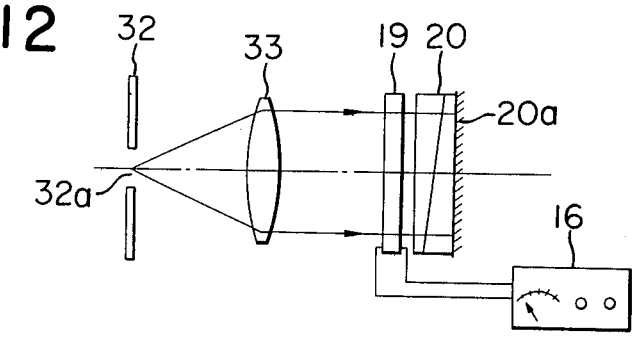

FIG. 12 illustrates a combination of the EO element 19 and the polarization optical element 20 for use as the deflector. In this combined construction, a reflective coating is applied on one surface 20a of the polarization optical element 20 so that the reflection type deflecting system may be formed with the EO element 19 and the polarization optical element 20. As shown in FIG. 12, when no electric field is applied to the EO element 19, the light beam passing through the aperture 32a is reflected and deflected by the deflecting system (19, 20) to form its image on the aperture 32a. As stated in the foregoing, when the deflector is constructed with a combination of this EO element 19 and the polarization optical element 20, the incident light beam should desirably be one that has been deflected.

Figure 13:
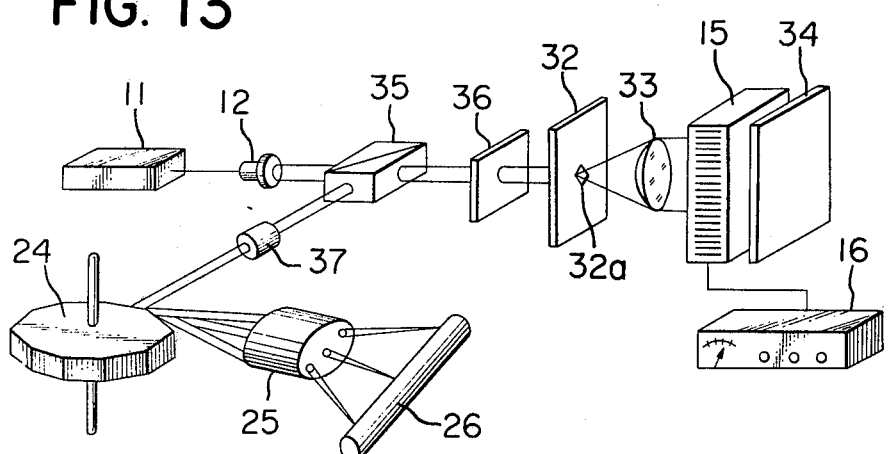
FIGS. 13 and 14 are respectively perspective views showing different embodiments of the scanning optical system utilizing the half tone image forming optical system of the present invention.

FIG. 13 shows a schematic perspective view of one embodiment of the scanning optical system utilizing the reflection-deflection type half tone image forming optical system according to the present invention. A linear, deflected beam emitted from the laser 11 is expanded by the beam expander 12 to an appropriately increased beam diameter and passes through a $\frac{1}{4}\lambda$ plate 36 after its passage through the deflecting beam splitter 35. The parallel beam which has passed through the $\frac{1}{4}\lambda$ plate then illuminates the aperture 32a of the light intercepting plate 32. The beam with the aperture 32a as the secondary light source is rendered a parallel beam by the image forming lens system 33, and enters into the AO element 15 which is controlled by a signal from the control circuit 16. The beam deflected by the AO element 15 is reflected at the reflecting mirror 34, and enters again into the AO element 15. After the beam is again deflected by the AO element 15, it forms the image of the aperture 32a on the light intercepting plate 32 by the image forming lens system 33. At this time, the scanning beam passes through only a portion where the aperture 32a and the aperture image overlap each other. The scanning beam with this aperture 32a as a new light source passes through the $\frac{1}{4}\lambda$ plate 36, after which it is turned to a linear, deflected light rotated by 90 degrees. Then, this linear, deflected light is bent by the deflecting beam splitter 35, after which it is rendered a parallel beam by the collimator lens 37, and is finally projected onto the rotatory polygonal mirror. The beam which has been scanned by the rotatory polygonal mirror 24 passes through the scanning image forming lens 25 and forms an image on the photosensitive drum 26 as the scanning surface. By the rotation of the rotary polygonal mirror 24, the scanning beam linearly scans on the photosensitive drum 26, and, at the same time, by the rotation of this drum 26, the two dimensional scanning is conducted. In this embodiment, the beam is divided by using the deflecting beam splitter 35 and the $\frac{1}{4}\lambda$ plate 36. The reason for this is that the energy loss in the beam can be prevented much better by using the deflecting beam splitter than by using a simple half mirror. When the deflecting beam splitter is to be used, the beam from the light source should be linearly deflected.

In the embodiment shown in FIG. 13, the $\frac{1}{4}\lambda$ plate 36 is interposed between the deflecting beam splitter 35 and the light intercepting plate 32, and, in order to remove any harmful reflection light at the image forming lens system 33 and the AO element 15, the ¼λ plate 36 may be provided between the AO element 15 and the reflecting mirror 34, and a deflecting plate of a type which causes the beam to pass therethrough in the linear deflecting direction of the scanning beam to be projected from the aperture 32a may be provided between the beam splitter 35 and the rotatory polygonal mirror 24. The reason for such arrangement is to distinguish the deflecting direction of the information light from that of the reflected light (noise) by 90-degrees rotation. Needless to say, no deflecting plate is required, if the deflecting beam splitter is made with high precision. Further, the embodiments of the half tone image forming optical system as shown in FIGS. 9 and 10B, are of such construction that the scanning beam can always be taken out without provision of the deflecting beam splitter. For removing any harmful reflection light to occur on the surface of the image forming lens system in such optical system, it is necessary that the scanning beam to be projected into the aperture 32f be linearly deflected, a ¼λ plate be interposed between the image forming lens system 33 and the AO element 15, and a deflector which causes only the scanning beam projected from the aperture 32g to pass therethrough be provided.

The optical systems shown in FIGS. 6 to 13 are so designed that the half tone image forming optical system is substantially reflected by the use of the reflecting surface, in which the deflection-reflection optical system consisting of the deflector and the reflecting surface is effectively utilized to design the optical system in a compact shape. Also, owing to the beam passing through the deflector for a plurality of numbers of times, a difficulty such that the deflecting angle of the deflector made of a crystal is small can be solved. Moreover, by integrally forming the deflector and the reflecting surface, undesirable effects caused by vibration, and so forth, may be alleviated. In addition, by deflecting the scanning beam, and separating the beam to enter into the half tone image forming optical system from the beam to be projected out of the optical system by means of the deflecting beam splitter, the power of the scanning beam is effectively utilized, and the harmful reflection light produced in the optical system is removed.

Figure 14:
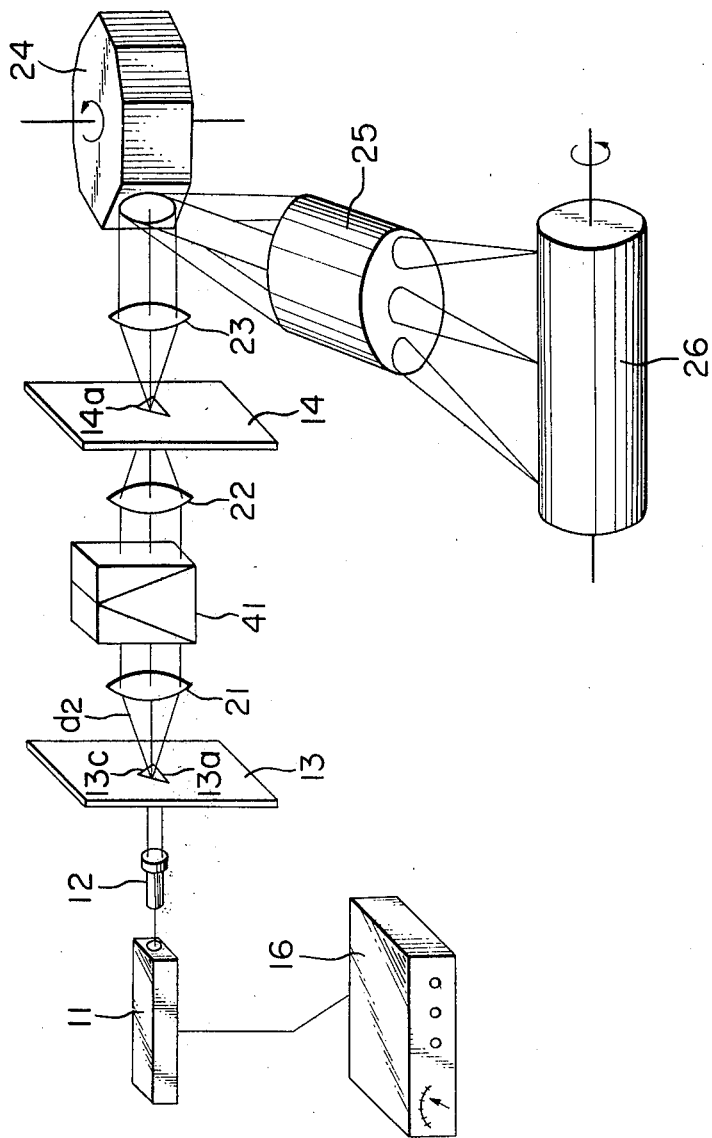

FIG. 14 is a perspective view showing another embodiment of the scanning optical system, in which a half tone signal of an image is to be converted to the wavelength change in the scanning beam. That is, a beam which is oscillated from the laser 11 can be varied in wavelength by a signal from the control circuit 16. The signal from the control circuit 16 gives information necessary to write-in or display. The scanning beam to be oscillated from the laser 11 is rendered a parallel light beam having an appropriate beam diameter by the beam expander 12, and illuminates the incidence aperture 13a of the incidence slit 13. Diffracted light using the incidence aperture 13a as the secondary light source is rendered a parallel light by the incidence lens 21 having one of its focal planes on the aperture 13a, and enters into the color dispersion prism 41. The light beam which has passed through the color dispersion prism 41 forms an image of the incidence aperture 13a on the projection aperture 14a by means of the projection lens 22 having one of its focal planes in the projection aperture 14a of the projection slit 14. By the way, the light beam d₂ shown in the drawing figure indicates the light beam using the point 13c in the incidence aperture 13a as the secondary light source. Accordingly, by varying the wavelength of the projection beam from the laser 11, it becomes possible that the projection angle of the light beam from the prism 44 can be varied by the color dispersion action of the prism 41. As mentioned above, since the incidence aperture 13a and the projection aperture 14a are at a position optically conjugative with each other with respect to the image forming optical system (21, 22), the image of the incidence aperture varies its position on the plane of the porjection aperture in accordance with changes in the wavelength of the scanning beam from the light source, and the scanning beam passes through only a portion where the incidence aperture image overlaps with the projection aperture. The light beam passing through this projection aperture 14a becomes a parallel light by a collimator lens 23, is scanned by the rotary polygonal mirror 24, and forms an image on the photosensitive drum 26 through the image forming lens 25. Thus, by rotation of the rotatory polygonal mirror 24 and the photosensitive drum 26, the scanning beam performs two dimensional scanning over the photosensitive drum.

In the following, further details of the above-mentioned color dispersion prism will be given.

Figure 15:
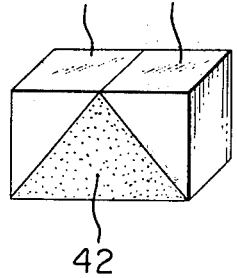
FIG. 15 is a perspective view showing one embodiment of a color dispersion prism to be used for the half tone image forming optical system according to the present invention.

FIG. 15 is a schematic perspective view showing one embodiment of the color dispersion prism for use in the present invention, which is constructed with three pieces of component prism being adhered together. The prism 42 consists of a high dispersion glass, and is held between two prisms 43 and 44 consisting of low dispersion glass. By appropriately selecting a wedge angle of the prism 42, and joining thereto the other prisms (43, 44), the resultant color dispersion prism brings about such effects that it removes the deflecting action to a certain kind of wavelength, while it gradually exhibits the deflecting action, according to the wavelength changes. A large color dispersion characteristic can be obtained with the prism, if LaK is used as the low dispersion glass, and SF is used as the high dispersion glass. The color dispersion prism is constructed with more than two pieces of the component prisms, and it is desirable that the surface of the color dispersion prism, onto which the scanning beam is projected, and the surface thereof, from which the scanning beam is projected be manufactured in parallel each other. The position of arranging the component prisms having different degrees of dispersion to constitute the color dispersion prism may be arbitrarily determined depending upon the purpose of use of the prism.

In the following, explanations will be given as to a tunable laser which emits a light beam of variable wavelength. The tunable laser is capable of varying the wavelength range of the scanning beam to a considerable extent by the use of, for example, a pigment laser.

Figure 16:
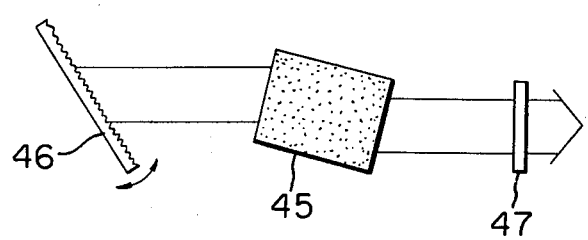
FIG. 16 is a schematic view showing one embodiment of a tunable laser to be used for the half tone image forming optical system according to the present invention.

FIG. 16 is a schematic diagram showing a tunable pigment laser. A pigment cell 45 which has been excited from outside performs transition due to the energy level of the pigment, and performs the laser oscillation by a resonator composed of a diffraction grating 46 and a half mirror 47. In this tunable laser, a selected wavelength can be varied by an angle of inclination of this diffraction grating 46. When the displacement of this diffraction grating 46 is varied in accordance with a light information to be obtained, a signal modulation (i.e., frequency modulation) by the wavelength can be achieved. In place of this diffraction grating 46, if a reflection type acousto-optical light modulating element is used to vary the wavelength pitch of the supersonic wave to be applied to the element, the pitch of th acousto-optical light modulating element as the diffraction grating can be varied, whereby the wavelength selection becomes possible. For the pigment, those having as many energy levels as possible in the vicinity of the wavelength to be used are desirable.

For the method of varying the wavelength, there may be employed well known wavelength-variable lasers such as spin-flip type laser, polariton type laser, and semiconductor laser, due to the photo-parametric oscillation and the Raman effect, and high pressure gas laser, and so forth.

Figure 17:
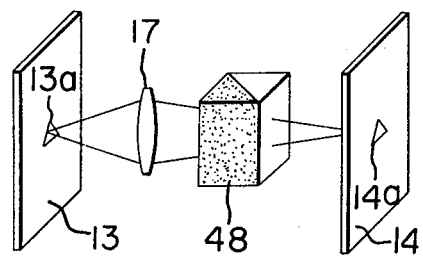

FIG. 17 illustrates still other embodiment of the half tone image forming optical system according to the present invention, in which the color dispersion prism 48 is disposed in a non-parallel beam path. In this embodiment, too, both slit plates (13, 14) are disposed at positions which are substantially optically conjugative with respect to the image forming optical system 17, as mentioned in the foregoing. The color dispersion prism 48 in this FIG. 17 is constructed with two component prisms which are mutually adhered together, and the incidence surface and projection surface of the scanning beam into and out of the color dispersion prism 48 are maintained parallel to each other. The reason for such arrangement is that, in case the incidence surface and the projection surface of the scanning beam into and out of the color dispersion prism are not maintained parallel, positional errors are liable to occur due to variations in wavelength of the scanning beam. Incidentally, the arrangement of the lens 17 and the color dispersion prism 48 in FIG. 17 may be reversed.

FIG. 18 illustrates a further embodiment of the half tone image forming optical system, in which one surface 49a of the color dispersion prism 49 is coated with a reflective substance. Since the color dispersion prism 49 is to refract a beam in accordance with wavelength of the incidence beam, the light beam to be projected into the half tone image forming optical system, in this embodiment, has a wavelength corresponding to a write-in information. Therefore, if the color dispersion prism 49 is so designed that it does not function as the prism with respect to a light beam of a wavelength of a certain standard, a light beam which passes through the aperture 32a and enters into the color dispersion prism 49 impinges perpendicularly on the reflecting surface 49a, so that it traces back the incidence path to return to the aperture 32a.

The size of the color dispersion prism can be made minimum, when it is provided in the vicinity of the spectral position of the incidence aperture due to the incidence lens (17, 21, 33) in the abovementioned half tone image forming optical system.

In the following, explanations will be given as to the way, in which the half tone image is obtained, in reference to the scanning optical system shown in FIG. 5.

FIGS. 19A, 19B, and 19C indicate changes in overlap of a conjugated image 13′a and the projection aperture 14a due to the lens (21, 22) of the incidence aperture 13, i.e., modes of change in the cross-sectional area of the scanning beam, when the scanning beam changes its angle after it is projected from the AO element 15 which has been subjected to the frequency modulation by the control circuit 16 in the optical system shown in FIG. 5. FIG. 19A shows an overlapped portion $S_1$ of the conjugated image 13′a and the projection aperture 14a due to the lens (21, 22) of the incidence aperture 13a when the supersonic wave propagating through the AO element 15 has its frequency $\omega_0$; FIG. 19B indicates an overlapped portion $S_2$ of the conjugated image and the projection aperture when the supersonic wave frequency is $\omega_0 + \epsilon\omega_1$; and FIG. 19C shows an overlapped portion $S_3$ of the conjugated image and the projection aperture when the supersonic wave frequency is $\omega_0 + \epsilon\omega_2$ ($|\omega_2| > |\Delta\omega_1|$). The shape of the photosensitive characteristic curve of the drum 26 at this time is shown as the solid curve $d_5$ in FIG. 20, and the maximum intensity of the light intensity distribution of the scanning beam on this drum 26 having a shape to be recorded as shown in FIGS. 19A, 19B, and 19C is to come to a sufficiently saturated portion on this solid line curve $d_5$. Now assume that there exists no aberration in the optical system between the projection aperture 14a and the photosensitive drum 26, and expansion of the beam due to its diffraction is sufficiently smaller than the size of the spot formed on the photosensitive drum 26, the light intensity distribution of the scanning spot on the drum is determined in terms of a geometric optical size. In this consequence, the scanning spot on the photosensitive drum 26 can be regarded as a constant light intensity distribution in a cross-sectional shape ($S_1$, $S_2$, $S_3$) of the light beam passing through the projection aperture 14a. This state is shown in FIGS. 21A, 21B, and 21C, in which the surface of the photosensitive drum is represented by x-y axis, and light intensity I is represented by the ordinate.

FIG. 21A indicates the light intensity of the spot corresponding to that in FIG. 19A, FIG. 21B to FIG. 19B, and FIG. 21C to FIG. 19C, respectively. When these spots are recorded on the photosensitive drum 26, they will be recorded as the spots, each having different area of $S_1'$, $S_2'$, and $S_3'$ as shown in FIG. 22.

The characteristic curves shown in dotted lines in FIG. 20 indicate states, wherein the curves have changed their shapes owing to changes in the circumstances. Where there is a sufficient difference in intensity between the maximum value $\alpha$ (bright portion) and the minimum value $\beta$ (dark portion) in the light intensity distribution to be recorded, changes in the characteristic curve with respect to the light intensity are few, and the shape of the net point to be recorded is not much different from that shown in FIG. 22.

In the following a relationship between the incidence aperture and the spatial spectrum of the aperture will be explained.

FIG. 23 shows one embodiment of the half tone image forming optical system, in which the focal length of the incidence lens 21 is represented by $f_b$, and the focal length of the projection lens is represented by $f_c$. A position where the AO element 15 is placed is away from the incidence lens 21 by a distance $f_b$, and away from the projection lens 22 by a distance $f_c$. The incidence aperture 13a is disposed at a position away from the incidence lens 21 by a distance $f_b$, while the projection aperture 14a is disposed at a position away from the projection lens 22 by a distance $f_c$. Coherent light emitted from the laser 11 is converted to a plane wave which has been expanded by the beam expander 12, and illuminates the incidence aperture 13a. The diffracted light by the incidence aperture 13a produces a Fraunhofer spectrum by the incidence lens 21 at a position $f_b$ behind the incidence lens. The expansion g(xi, yi) of this spectrum is given in the following equation, when the transmission distribution of the incidence aperture is represented by f(xo, yo), and wavelength of the light is represented by $\lambda$:

$$g(xi, yi) = \int_{-\infty}^{\infty} f(xo, yo) e^{-2\pi i (Xxo + Yyo)} \, dxo \, dyo$$

(where: $xo, yo, xi, yi$ are the coordinates system taken perpendicularly with respect to the optical axis, and have a relationship of $X = (xi)/(\lambda f_b)$, $Y = (yi)/(\lambda f_b)$.).

Figure 24:
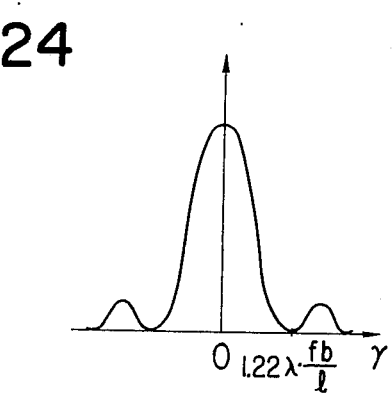
FIG. 24 is a graphical representation showing spectral intensity distribution of spectral the incident aperture.

For example, if the incidence aperture is a circle having a diameter $l$, the intensity distribution of the spectrum is denoted in the form of the so-called "Airy pattern" as shown in FIG. 24 which is given by the following equation; provided that $$\gamma = \sqrt{xi^2 + yi^2}$$

and $J_1$ are taken as the primary Bessel function:

$$g(\gamma) = \left( \frac{kl^2}{8f_b} \right)^2 \left[ 2 \cdot \frac{J_1(kl\gamma/2f_b)}{kl\gamma/2f_b} \right]^2$$

As seen from the graphical representation in FIG. 24, approximately 84% of the energy distribution concentrates on the zero order of the coordinate system, which is the center of the energy distribution. The initial zero point of the energy distribution is given by $\gamma_0 = 1.22\lambda \cdot (f_b)/(l)$. Though the value of $\gamma_0$ more or less changes depending on the values of $\lambda$, $f_b$, and $l$, it becomes very small if $l > \lambda$. The same thing holds true with apertures having a shape other than the circle. For securing quick response to the frequency of the supersonic wave having the diffraction angle of the scanning beam emitting from the AO element, the characteristic of the element should be such that, when the frequency of the supersonic wave propagating through the AO element is changed, the scanning beam be projected into the element in the form of a thin beam; in other words, the AO element be provided at a position of the spectral image surface where the expansion of the beam projected thereinto by the incidence lens is the least.

Figure 25:
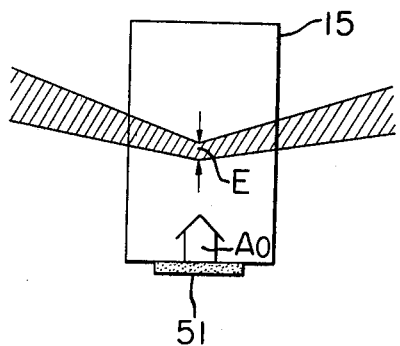
FIGS. 25 and 26 are respectively diagrams for explaining the response speed of an A0 element.

FIG. 25 explains the above-described situation in the AO element, wherein, when vibration of a certain definite frequency $\omega_0$ is given by a vibrator 51 attached to one end surface of the AO element 15, the wave surface of the supersonic wave proceeds in the direction of the arrow mark $A_0$ due to the vibration. Next, when the frequency $\omega_0$ changes to another frequency $\omega_1$, the time $\tau$ required for the deflecting angle to be displaced to an angle corresponding to this frequency $\omega_1$ is given in the following equation:

$$\tau \propto E/V$$

(where: V is a speed of the supersonic wave within the element 15; and E is expansion of the scanning beam.).

Figure 26:
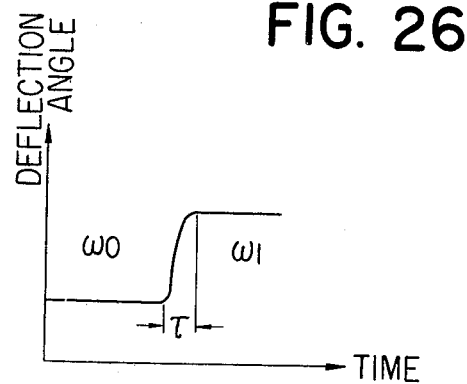

FIG. 26 is a graphical representation showing the above-described changes, in which the time is taken on the abcissa, and the deflecting angle is taken on the ordinate. In order that the response time $\tau$ may be quickened, it is necessary to reduce the expansion E of the beam in the element. To obtain the quickest response characteristic, the AO element may be disposed at a position of the Fraunhofer diffraction image by the image forming lens of the incidence aperture, i.e., at the focusing position of the image forming lens, as mentioned in the foregoing. In addition, when the element is disposed at a position of this spectral image, the size of the deflector can be minimized.

Incidentally, while the spectral image of the incidence aperture due to the incidence lens 21 is inversely converted by the projection lens 22, if the focal length of the incidence lens 21 is not equal to that of the projection lens 22, the image forming magnification is not 1, on account of which the sizes of both incidence and projection apertures need be determined in conjunction with the image forming magnification.

In the folowing, explanations will be given as to the shape of the incidence aperture, and the manner of providing the AO element relative to the abovementioned response time $\tau$. When the incidence aperture 13a is not a circle, but is of a shape having a longer side in one direction such as, for example, a rectangular shape, the AO element is disposed in such a manner that the direction of the long side of the rectangular aperture may be coincided with the travelling direction of the supersonic wave plane propagating through the AO element. This has something to do with the expansion of the image to be diffracted by the incidence aperture, the reason for which is that the expansion of the image to be diffracted to the direction of the long side of the aperture width is narrower than the expansion of the image to be diffracted in the direction of the short side of the aperture width. Accordingly, by coinciding the direction of the narrow expansion of the diffracted image on the AO element with the travelling direction of the supersonic wave propagating through the AO element, the response speed can be increased. Also, the shape of the aperture should desirably be such one that conforms to the laser beam which is usually Gaussian beam.

Although the invention has been described in the foregoing in reference to various preferred embodiments thereof, it should be noted that these embodiments are merely illustrative and not so restrictive and that any changes and modifications may be made by those skilled in the art within the spirit and scope of the invention as recited in the appended claims.

What is claimed is:

1. A scanning optical system to control the formation of a half tone image, which comprises in combination:
   (a) a light source;
   (b) means defining a first aperture, to restrict a light beam from said light source, and a second aperture;
   (c) a first image forming optical system, wherein said light source and said first image forming optical system are provided on opposite sides of said first aperture, and wherein said second aperture is provided at a position optically conjugative with said first aperture relative to said first image forming optical system;
   (d) a scanning surface to receive the light beam from said second aperture;
   (e) a second image forming optical system interposed between said second aperture and said scanning surface so as to render optically conjugative the position of said second aperture and the position of said scanning surface; and
   (f) deflector means composed of a crystal and interposed between said first aperture and said second aperture for controlling the position of the beam from said first aperture projected across said second aperture to thereby vary the cross-sectional area of the beam received by said scanning surface, and wherein said deflector means is positioned such that the spectral image plane for the light beam from said light source which passes through said first aperture is at substantially the center of said deflector means along the optical axis of said first image forming optical system.

2. The scanning optical system as claimed in claim 1, wherein the light beam to illuminate said first aperture is a parallel beam.

3. The scanning optical system as claimed in claim 2, wherein said first image forming optical system consists of a first image forming lens system and a second image forming lens system, and said deflector means is interposed between said first image forming lens system and said second image forming lens system.

4. The scanning optical system as claimed in claim 3, wherein the focal length of said first image forming lens system and the focal length of said second image forming lens system are equal, and said first aperture is present at a position of the front focus of said first image forming lens system, and said second aperture is present at a position of the rear focus of said second image forming lens system.

5. The scanning optical system as claimed in claim 4, wherein said deflector means is a prism which utilizes an electro-optical light modulating element.

6. The scanning optical system as claimed in claim 4, wherein said deflector means is a combination of an electro-optical light modulating element and an optical element which splits natural light into two light beams which are not parallel to each other, but orthogonally intersect in their deflecting planes.

7. The scanning optical system as claimed in claim 4, wherein said deflector means is an acousto-optical light modulating element.

8. The scanning optical system as claimed in claim 3, wherein the focal length of said first image forming lens system and the focal length of said second image forming lens system are different, and said first aperture is present at a position of the front focus of said first image forming lens system, and said second aperture is present at a position of the rear focus of said second image forming lens system.

9. The scanning optical system as claimed in claim 8, wherein said deflector means is a prism utilizing an electro-optical light modulating element.

10. The scanning optical system as claimed in claim 8, wherein said deflector means is a combination of an electro-optical light modulating element and an optical element which splits natural light into two light beams which are not parallel to each other, but orthogonally intersect in their deflecting planes.

11. The scanning optical system as claimed in claim 8, wherein said deflector means is an acousto-optical light modulating element.

12. The scanning optical system as claimed in claim 2, wherein said first image forming optical system consists of an image forming lens system.

13. The scanning optical system as claimed in claim 12, wherein said deflector means is interposed between said image forming lens system and said second aperture.

14. The scanning optical system as claimed in claim 13, wherein said deflector means is a prism utilizing an electro-optical light modulating element.

15. The scanning optical system as claimed in claim 13, wherein said deflector means is a combination of an electro-optical light modulating element and an optical element which splits natural light into two light beams which are not parallel each other, but orthogonally intersect in their deflecting phase.

16. The scanning optical system as claimed in claim 13, wherein said deflector means is an acousto-optical light modulating element.

17. A scanning optical system capable of controlling the formation of a half tone image, which comprises in combination:
(a) a light source;
(b) means defining a first aperture, to restrict a deflected light beam from said light source, and a second aperture;
(c) a first image forming optical system, wherein said light source and said first image forming optical system are provided on opposite sides of said first aperture, and wherein said second aperture is provided at a position optically conjugative with said first aperture relative to said first image forming optical system;
(d) a scanning surface to receive the light beam from said second aperture;
(e) a second image forming optical system interposed between said second aperture and said scanning surface so as to render optically conjugative the position of said second aperture and the position of said scanning surface;
(f) a deflector means composed of a crystal and interposed between said first aperture and said second aperture, for controlling the position of the beam from said first aperture projected across said second aperture to thereby vary the cross-sectional area of the beam received by said scanning surface;
(g) reflecting means provided between said first aperture and said second aperture at a position where the light beam from said first aperture is subjected at least twice to light deflection by said deflector means and
(h) a $\frac{1}{4}\lambda$ plate interposed between said first image forming optical system and said reflecting means.

18. The scanning optical system as claimed in claim 17, wherein both said first aperture and said second aperture are present in one of the focal planes of said first image forming optical system, and said apertures are provided in such a manner that the optical axis of said first image forming optical system is situated in the middle of said apertures.

19. The scanning optical system as claimed in claim 17, wherein both said first aperture and said second aperture are present in one of the focal planes of said first image forming optical system, and said apertures are mutually overlapped.

20. A scanning optical system capable of controlling half tone of an image, which comprises in combination:
(a) a light source;
(b) means defining an aperture to restrict a light beam from said light source;
(c) a deflector composed of a crystal, wherein said deflector and said light source are provided on opposite sides of said aperture;
(d) a reflecting surface, wherein said deflector is interposed between said aperture and said reflecting surface;
(e) a first image forming optical system interposed between said aperture and said deflector in such a manner that the position of one of the focal planes thereof overlaps with the position of said aperture;
(f) a light divider interposed between said light source and said aperture;

(g) a scanner to scan the light beam from said aperture which has passed through said light divider;

(h) a scanning surface for scanning by the light beam from said scanner; and (i) a second image forming optical system interposed between said aperture and said scanning surface so as to render optically conjugative the position of said aperture and the position of said scanning surface;

21. The scanning optical system as claimed in claim 20, wherein said light divider is a deflecting beam splitter, wherein the incident light beam from said light source into said deflecting beam splitter is a rectilinear deflecting light beam, and wherein a plate is interposed between said deflecting beam splitter and said aperture.

22. A scanning optical system to control formation of a half tone image, which comprises in combination:

(a) a light source;

(b) means defining a first aperture, to restrict a light beam from said light source, and a second aperture;

(c) a first image forming optical system, wherein said light source and said first image forming optical system are positioned at opposite sides of said first aperture, and wherein said second aperture is provided at a position optically conjugative with said first aperture relative to said first image forming optical system;

(d) a scanning surface to receive the light beam from said second aperture;

(e) a second image forming optical system interposed between said second aperture and said scanning surface so as to render optically conjugative the position of said second aperture and the position of said scanning surface; and (f) control means to control the position of the beam from said first aperture projected across said second aperture, said control means comprising wavelength control means to vary the wavelength of the light beam from said light source, and deflecting direction control means, interposed between said first aperture and said second aperture, to control the deflecting direction of the light beam with variation in the wavelength of the light beam.

23. The scanning optical system as claimed in claim 22, wherein said deflecting direction control means is a color dispersion prism.

24. A scanning optical system to control the formation of a half tone image, which comprises in combination:

(a) a light source;

(b) a first light defining means to restrict a light beam from said light source;

(c) deflector means, composed of a crystal, for deflecting the light beam from said first light defining means;

(d) a second light defining means to restrict a light beam from said deflector means;

(e) a first image forming optical system for making the position of said first light defining means optically conjugative with the position of said second light defining means;

(f) a scanning surface to receive the light beam from said second light defining means;

(g) a second image forming optical system interposed between said second light defining means and said scanning surface so as to render optically conjugative the position of said second light defining means and the position of said scanning surface; and (h) reflecting means to subject the light beam from said first light defining means to said second light defining means at least two times to the same deflecting function of said deflecting means.

25. The scanning optical system as claimed in claim 24, wherein said first light defining means has a first aperture and said second light defining means has a second aperture.

26. The scanning optical system according to claim 25, wherein said first aperture and said second aperture are both present in one and the same plane provided perpendicularly with respect to the optical axis of said first image forming optical system.

27. The scanning optical system according to claim 26, wherein said first aperture and said second aperture are provided in one of the focal planes of said first image forming optical system.

28. The scanning optical system according to claim 27, wherein said first aperture and said second aperture are mutually overlapped, and are disposed away from the optical axis of said first image forming optical system.

29. The scanning optical system according to claim 27, wherein said first aperture and said second aperture are mutually overlapped, and are on the optical axis of said first image forming optical system.

30. The scanning optical system as claimed in claim 27, wherein said first aperture and said second aperture are provided in such a manner that the optical axis of said first image forming optical system is positioned in the middle of said apertures.

31. The scanning optical system as claimed in claim 24, wherein said reflecting means is a reflecting mirror provided on the opposite side of said first image forming optical system relative to said deflector means.

32. The scanning optical system as claimed in claim 24, wherein said reflecting means is a reflective coating film provided on said deflector means.

33. The scanning optical system as claimed in claim 24, wherein said reflecting means comprises a reflecting mirror provided between said deflector means and said first image forming optical system, and a reflective coating film provided on said deflector means.

* * * * *

UNITED STATES PATENT OFFICE
CERTIFICATE OF CORRECTION

Patent No. 4,268,871         Dated  May 19, 1981

Inventor(s)  NAOTO KAWAMURA

It is certified that error appears in the above-identified patent and that said Letters Patent are hereby corrected as shown below:

Column 1, line 42, "inevitably" should read --inevitable--;

Column 4, line 4, after "showing" insert --the--;
  line 5, delete "spectral" after "of";
  line 30, "acoustooptical" should read --acousto-optical--;

Column 8, line 60, insert --to-- after "parallel";

Column 9, line 3, "aperture" should read --apertures--;

Column 12, line 4, "44" should read --41--;

Column 13, line 1, "th" should read --the--;
  line 13, "other" should read --another--;

Column 14, line 4, "$\omega_0 + \epsilon\omega_1$" should read --$\omega_0 + \Delta\omega_1$--;

line 7, "$\omega_0 + \epsilon\omega_2$" should read --$\omega_0 + \Delta\omega_2$--;

line 52, delete "is" (second occurrence);

Column 15, line 31, change "$1 > \lambda$." to --$\ell \gg \lambda$.--;

UNITED STATES PATENT OFFICE
CERTIFICATE OF CORRECTION

Patent No. 4,268,871         Dated May 19, 1981

Inventor(s) NAOTO KAWAMURA

It is certified that error appears in the above-identified patent and that said Letters Patent are hereby corrected as shown below:

Column 18, line 1, Claim 15, after "parallel" insert --to--;

Column 19, line 14, Claim 21, change "a" to --the $1/4\lambda$--.

Signed and Sealed this

Twentieth Day of October 1981

[SEAL]

Attest:

GERALD J. MOSSINGHOFF

Attesting Officer    Commissioner of Patents and Trademarks